Nov. 10, 1953     N. HOGLUND     2,658,497
WHEEL DRESSING APPARATUS Filed July 12, 1950     6 Sheets-Sheet 1

INVENTOR.
Nils Hoglund
BY
William A. Balesak
ATTORNEY

Nov. 10, 1953 N. HOGLUND 2,658,497
WHEEL DRESSING APPARATUS
Filed July 12, 1950 6 Sheets-Sheet 2

INVENTOR.
Nils Hoglund
BY
William A. Zalesak
ATTORNEY

Nov. 10, 1953 N. HOGLUND 2,658,497
WHEEL DRESSING APPARATUS
Filed July 12, 1950 6 Sheets-Sheet 3

INVENTOR.
Nils Hoglund
BY
William A. Zalesak
ATTORNEY

Nov. 10, 1953   N. HOGLUND   2,658,497
WHEEL DRESSING APPARATUS
Filed July 12, 1950   6 Sheets-Sheet 5

INVENTOR.
Nils Hoglund
BY William A. Zalesak
ATTORNEY

Nov. 10, 1953

N. HOGLUND

2,658,497

WHEEL DRESSING APPARATUS

Filed July 12, 1950

INVENTOR.
*Nils Hoglund*
BY
*William A. Zalesak*
ATTORNEY

Patented Nov. 10, 1953

2,658,497

UNITED STATES PATENT OFFICE 2,658,497

WHEEL DRESSING APPARATUS

Nils Hoglund, Union, N. J.

Application July 12, 1950, Serial No. 173,419

12 Claims. (Cl. 125—11)

My invention relates to wheel dressing apparatus, more particularly to apparatus for automatically dressing, turning and forming precise contours on grinding wheels.

Prior apparatus for forming contours have employed different methods, one such being the conventional crushing method where a pre-shaped crusher roller is used for forming the wheel. Another employs a diamond dressing device which uses a template usually having a one-to-one ratio which is contacted by a follower to guide the diamond across the wheel being dressed. A modification of the last is a dressing device operating from a template with a one-to-one radial ratio and a two-to-one axial ratio, so designed that a follower and the template are travelling at a two-to-one ratio in the same direction, causing the diamond to produce the one-to-one ratio contour on the wheel in both co-ordinates. Other devices of this kind have also utilized a pantograph arrangement which supports the cutting diamond. Dressing devices of previous apparatus have usually employed as the prime movers complicated hydraulic mechanisms which are comparatively costly.

Further, due to the small ratio employed in some of the contour cams and followers associated therewith, error is introduced in the contour being formed unless the cam is extremely accurate. This requires careful, arduous and long preparation in manufacturing the cam.

Previous devices of this kind have also been complicated, requiring much space. In many cases the devices are not automatically controlled for successively passing the cutting diamond across the face of the wheel being dressed. Manual control of this operation induces further error.

It is, therefore, an object of my invention to provide an improved and simplified form of wheel dressing apparatus.

A further object of my invention is to provide such an improved apparatus which assures accurate contours by eliminating the need for pantograph operation which introduces cumulative error during operation.

A further object of my invention is to eliminate hydraulic operation and to utilize electrical driving means of simple form.

A further object of my invention is to provide an apparatus utilizing cams enlarged many times over the contour being dressed and of the order of, for example, ten times for controlling movement of the cutting tool whereby error is eliminated and accuracy assured.

A still further object of my invention is to provide cams having a sufficiently large ratio so that the contour on the cams can be easily retouched to correct for any inaccuracies shown on the finished contour.

A further object of my invention is to provide such an apparatus which is compact and which is automatic and which eliminates the skill required for dressing when manual operation or semi-manual operation is employed.

These and other further objects will appear hereinafter.

In accordance with my invention I provide a grinding wheel dressing mechanism including a base for supporting a movable housing mounted for movement transversely of the grinding wheel, whose contour is to be dressed. The housing supports a dressing tool including a cutting diamond mounted on a movable support which can be moved vertically up and down in accordance with a predetermined pattern as the housing moves transversely of the grinding wheel surface. The result is to reproduce a contour determined by a cam mechanism controlling movement of the diamond tool and its support.

Mounted within the housing is a slide supporting a pair of cams, one of which cooperates with the fixed member and determines movement of the housing as a whole, and the other of which cooperates with a cam follower in turn controlling the vertical movement of a slide on which the cutting tool is mounted. A driving means in the form of an electric motor and rack mechanism moves the cam slide within the housing for causing movement of the housing along the supporting base and the movement of the dressing diamond vertically with respect to the base. The cams can be made interchangeable to vary the movement of the housing and the movement of the tool in the predetermined manner so as to govern the ratio of the movement of the housing to the cam slide and to the movement of the dressing tool.

The novel features which I believe to be characteristic of my invention are set forth with particularity in the appended claims, but the invention itself will best be understood by reference to the following description taken in connection with the accompanying drawing in which

Referring to Figures 1 to 4 inclusive, apparatus made in accordance with my invention includes base 20 having leg portions 21 and 22 for supporting the base. The cross slide housing assembly includes the T-shaped housing frame 23 having cover members 24 and 25. An electric driving motor 26 is supported on the cover 24. The diamond dressing tool support and assembly 27 is supported on the back cover 25 and supports the dressing tool 28 for vertical movement. The dressing tool is supported on a slide to be described. The housing 23, motor 26 and tool support and assembly 27 are slidably mounted on the base 20 for movement longitudinally of the base and transversely of the surface of a grinding wheel to be dressed. The tool 28 is mounted for vertical movement as it is moved transversely of the surface of the grinding wheel being dressed. Spring members 29 and 30 are received within cavities to be described in the base and contact spring retainer elements 31 and 32 on the housing frame of the cross slide assembly to urge the assembly to the rear or right as shown in the right elevation shown in Figure 3. Spring guide rods mounted on the retainers help support the springs.

A pin and cam mechanism determines the extent of the movement of the cross slide assembly and a second cam and cam slide follower mechanism to be described determine the vertical movement of the diamond tool. These members are enclosed within the housing. The motor 26 in cooperation with mechanism to be described furnishes the motive power to produce both motions; that is, of the cross slide housing assembly and the tool. As the cross slide housing assembly is moved longitudinally of the base or transversely of the surface of the wheel being dressed, the dressing tool 28 will be moved according to a predetermined pattern in a vertical direction both up and down so that as the tool moves transversely across the surface of the wheel being dressed it will cut a contour of predetermined design on the surface of the grinding wheel.

*Base assembly*

Figure 1:
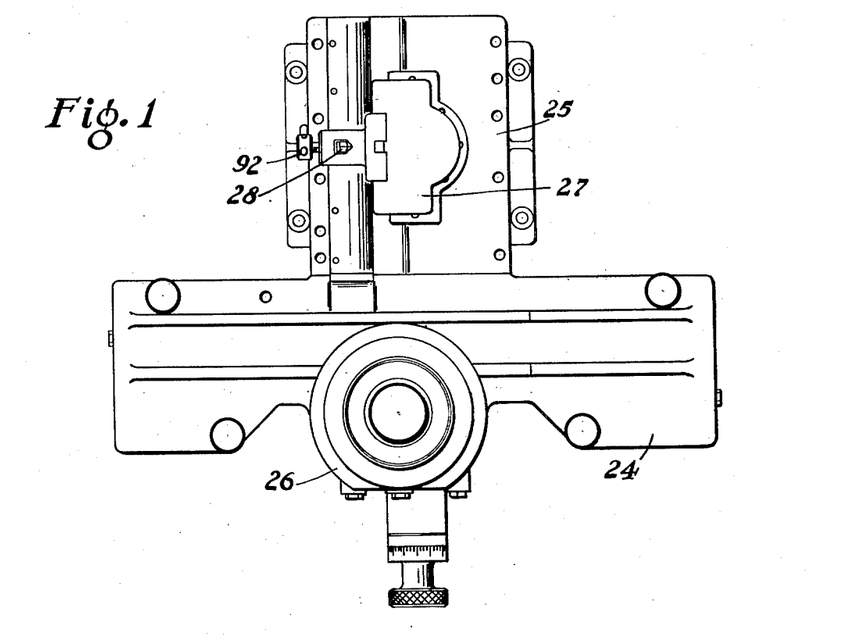
Figure 1 is a plan view of a dressing apparatus made according to my invention.
Figure 2:
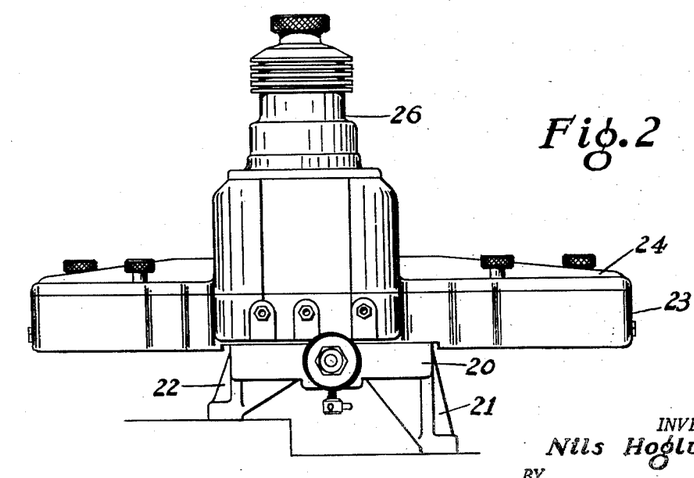
Figure 2 is a front end elevation of Figure 1.
Figure 3:
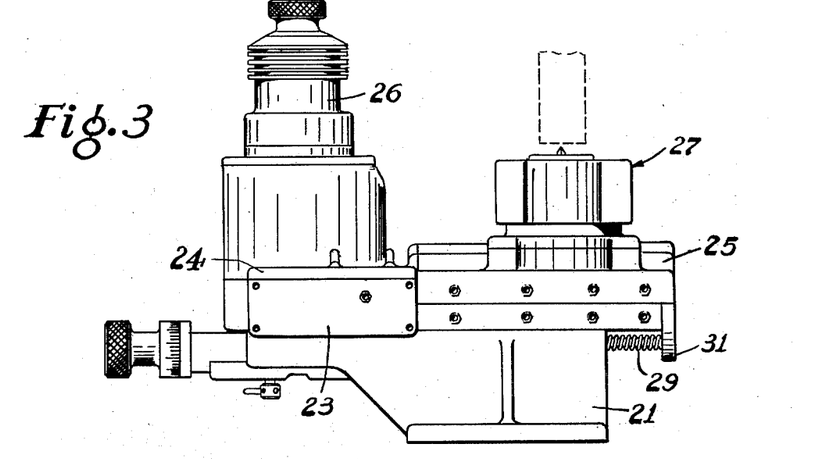
Figure 3 is a side elevation of Figures 1 and 2.
Figure 4:
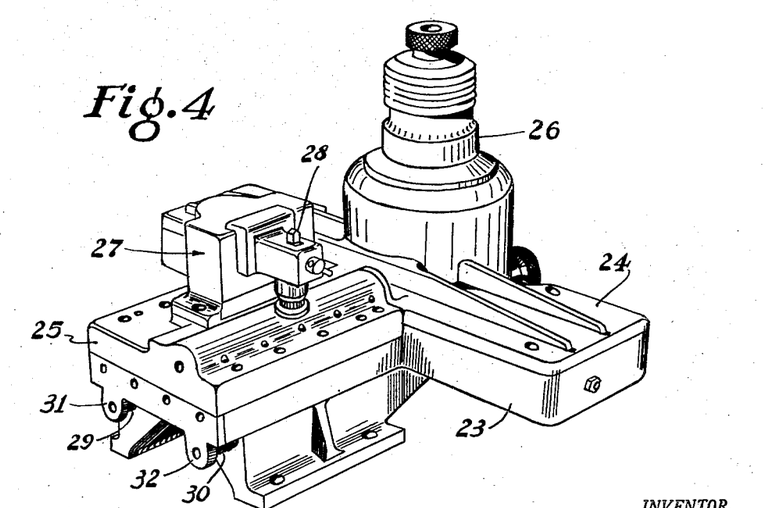
Figure 4 is a perspective from the rear of apparatus made according to my invention.
Figure 5:
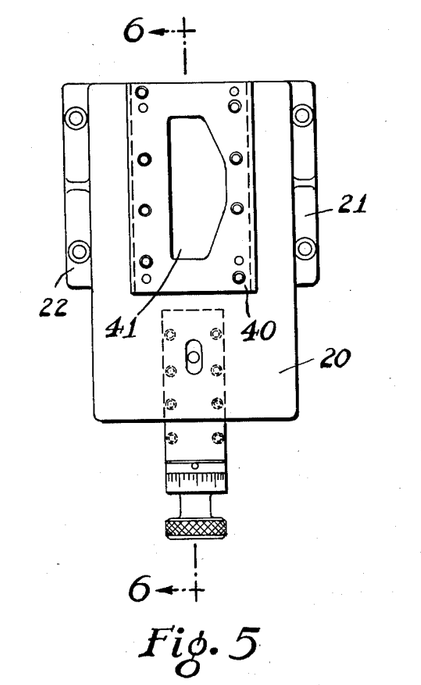
Figure 5 is a plan view of the base assembly.
Figure 6:
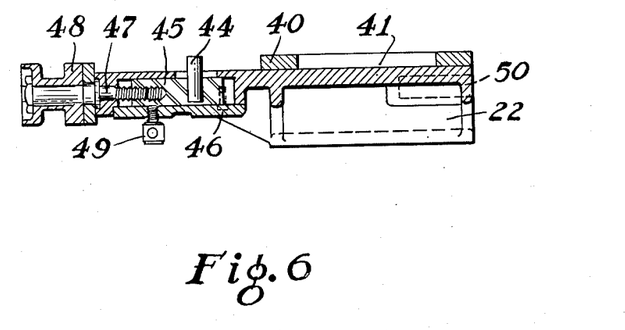
Figure 6 is a section taken along the line 6—6 of Figure 5.

As shown in Figures 4 to 6, the base assembly including the base 20 and having legs 21 and 22 supports the ball bearing slide guide 40 having the apertured portion 41 for receiving a portion of the diamond tool support. Ball bearing assemblies 42 and 43 are received in the slots in the slide guide and provide a ball bearing support for the housing frame 23. The entire cross slide housing assembly can slide longitudinally of the base on these ball bearing supports.

Figure 7:
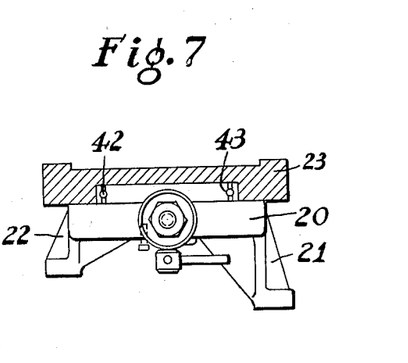
Figure 7 is a front end elevation of Figure 5 with certain details added and shown in section.

Mounted on the front end of the base is the cam follower pin 44 mounted on the slide 45, held in place by cover 46. The slide 45 and pin 44 can be moved longitudinally by the lead screw 47. They can be adjusted by means of the adjusting wheel 48 longitudinally of the base and locked in fixed position by the locking screw 49. The base is provided with a pair of biasing spring cavities, such as 50, for receiving springs 29 and 30. As will be described in further detail below, adjustment of the pin 44 determines the initial position of the cross slide housing assembly and also co-acts with a cam to be described to cause movement of the housing.

*Cross slide operating mechanism*

Figure 8:
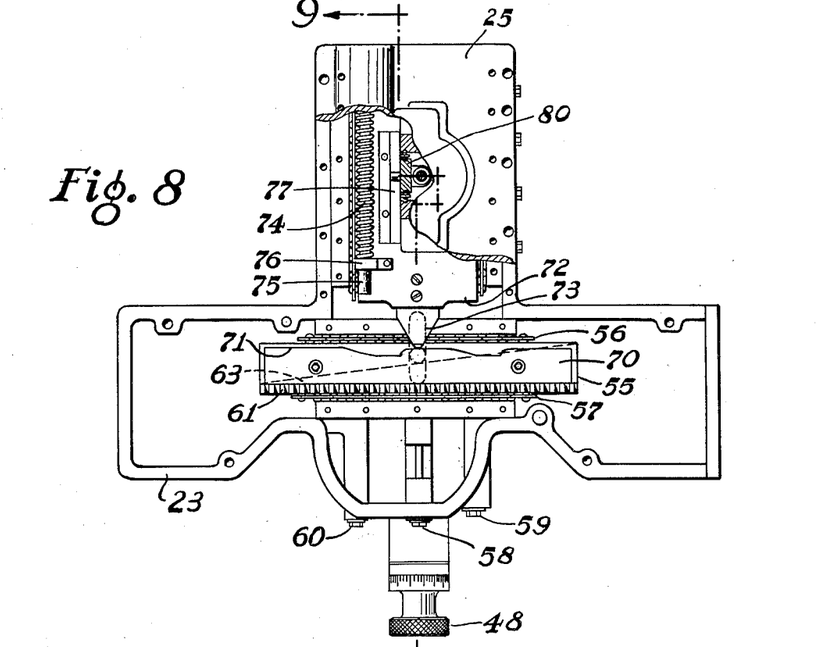
Figure 8 is a plan view with parts removed to show details of construction of the cam slide and cam follower mechanism.
Figure 9:
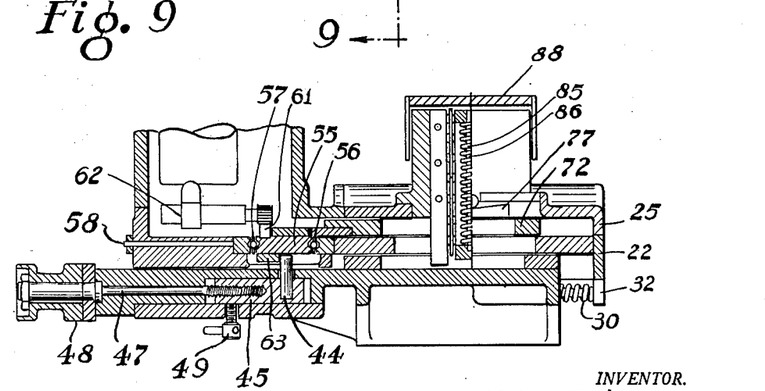
Figure 9 is a section taken along the line 9—9 of Figure 8.

Referring to Figures 8 and 9, a description will be given of the mechanism for controlling the longitudinal movement of the cross slide housing assembly.

Within the housing is a ball bearing supported slide 55 supported by ball bearing retainers 56 and 57, which are preloaded by means of screws 58, 59 and 60. This slide can move transversely of the longitudinal axis of the base. The slide supports on its upper surface a rack 61, which is driven by the motor 26 through the driving gear 62. Electrical circuits, not shown or described, control the direction of rotation of the motor, such that the slide is reciprocated back and forth within the housing, the motor being automatically reversed when the slide reaches either position.

This slide carries a pair of cams, one on its under surface to cause longitudinal movement of the housing and one on the upper surface to cause vertical movement of the dressing tool. The feed cam 63 on the under surface of the slide 55 and which controls the longitudinal movement of the housing, is an elongated triangular-shaped cam. It engages the cam follower pin 44 previously described. Pin 44 contacts the inclined edge of the cam 63, the springs 29 and 30 urging the cross slide housing assembly and cam against the pin 44 or to the right as shown in Figure 9.

As the slide 55 is reciprocated back and forth and as the slide and cam move to the left, see Figure 8, the cross slide housing assembly is moved to the left as shown in Figure 9, inasmuch as the pin 44 is stationary. As the slide and cam move to the right, the housing assembly is urged backward or to the right viewed in Figure 9 as less of the width of the cam is presented to the pin. Thus a reciprocating movement of the cross slide housing assembly results as the motor drives the slide back and forth through the rack and pinion drive.

Referring to Fig. 9 it is obvious that as the adjusting wheel 48 is rotated the position of the pin 44 is varied so that with the cam 63 stationary as the pin is moved to the left, the entire housing is moved to the left and as the pin is moved to the right the entire housing is urged to the right by the spring members 29 and 30.

It is also obvious that by changing the slope of the surface of the cam 63 that the ratio of the movement of the cross slide housing can be varied also.

*Contour and ratio cam for diamond tool slide assembly*

To move the diamond tool vertically as the cross slide assembly is moved parallel to the surface being dressed, I provide a contour and ratio cam assembly for operating the tool slide support according to a designed pattern.

As shown in Figure 8, I provide on the upper surface of the slide 55 the contour templet or cam 70 having the formed cam surface edge 71. Cooperating therewith is the slide 72 having the cam follower 73 cooperating with the cam edge 71. A spring 74 mounted on a guide and support pin 75 fixed to the housing 23 is in contact with the spring retainer 76 fixed to slide 72. Spring 74 is under compression and biases the slide 72 and cam follower 73 against the contour cam 70. The pin 75 extends through an aperture in retainer 76 so that the slide can move freely with respect to the pin.

Slide 72 carries thereon a vertically positioned ratio cam 77, which causes vertical movement of the tool slide when the slide 72 is caused to move back and forth in the housing. Prior to describing this action, the tool slide and support will be described.

*Diamond tool slide and support*

Figures 10, 11, 12:
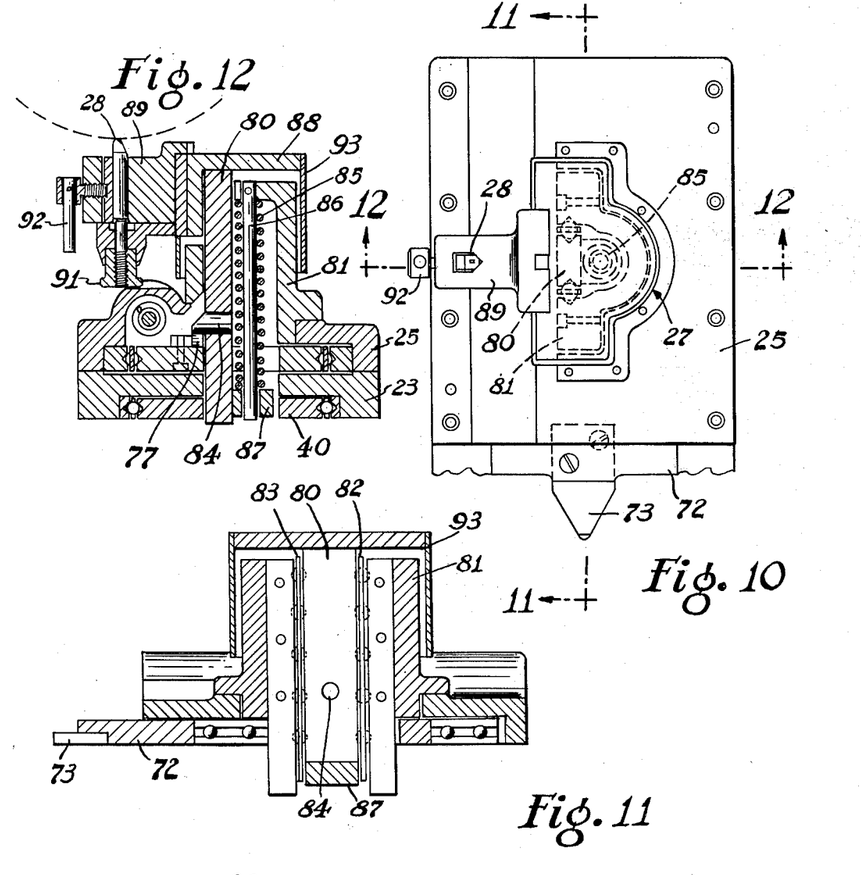
Figure 10 is a plan view of the tool slide housing.
Figure 11 is a section taken along the line 11—11 of Figure 10.
Figure 12 is a section taken along line 12—12 of Figure 10.

As shown in Figures 10 to 12 inclusive, there is mounted on the cover member 25 the diamond tool slide assembly designated generally at 27. A tool slide 80 is mounted for vertical movement in the supporting housing member 81 by ball bearing assemblies 82 and 83. The slide carries cam follower pin 84 which contacts the ratio cam 77 mounted on the slide 72. A biasing spring 85 mounted on the guide and support pin 86 fixed in the supporting housing member 81 abuts against spring retainer member 87 carried on slide 80. The pin extends through an aperture in the retainer to permit relative movement between the slide and pin. Diamond holder support 88 is secured to the slide. Releasable diamond holder 89 has mounted there dressing diamond 28. The position of the diamond 28 can be varied vertically by adjusting screw 91 and locked by locking screw 92. A dust cover 93 protects the internal structure.

Thus, as slide 55 is reciprocated back and forth, the cam 70 also moves back and forth and the cam follower 72 moves parallel to the longitudinal axis of the base in accordance with the pattern of the edge of the cam. As the slide 72 moves back and forth it also carries with it the ratio cam 77 which is shaped in the form of an elongated triangle. As it moves back and forth it forces the pin 84 and slide 80 against the compression spring 85 so that the entire tool support is caused to move vertically up and down in accordance with the pattern on the cam 70.

*General operation*

From the above it is clear as the slide 55 is reciprocated by motor 26 and the rack and pinion 61 and 62 and carries the cams 63 and 70 back and forth, the entire cross slide housing assembly is moved longitudinally of the base in accordance with the cam 63 and the tool is caused to move vertically in accordance with the contour of the cam 70 so that as the dressing tool moves transversely of the wheel being dressed, the tool moves up and down or in and out to produce on the grinding wheel surface a contour in accordance with the edge 71 of the cam 70.

Figure 13:
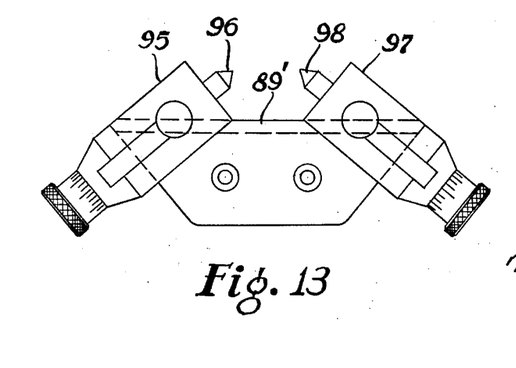
Figure 13 is a view of a modified form of dressing tool and support.
Figure 14:
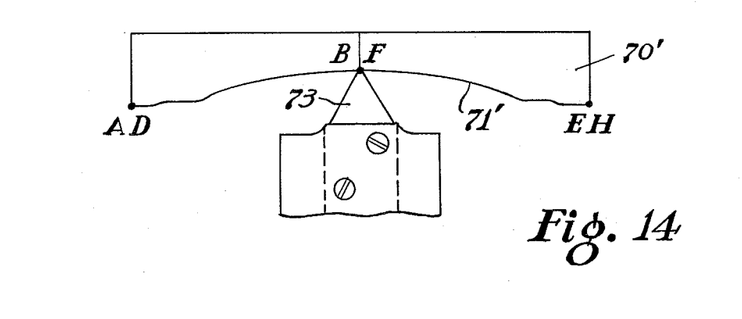
Figure 14 shows a modified form of cam and follower for producing a grinding wheel of the form shown in Figure 15 for grinding gear teeth.
Figure 15:
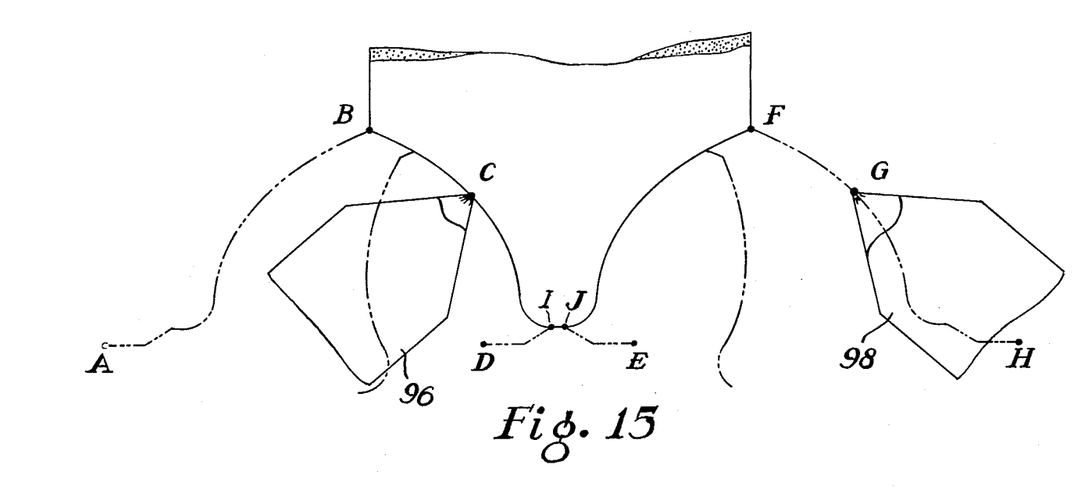

In Figure 13 I show a modified form of the dressing tool and its support in which the support 89' has mounted on its ends dressing tool supports 95 and 97 supporting diamond dressing tools 96 and 98. This arrangement permits the dressing of grinding wheels in a manner to make such wheels useful for grinding gear teeth, as best shown in Figures 14 and 15. In this arrangement I utilize a cam 70' having a contour edge 71' and mount this in place of the cam 70 in Figure 8. As the housing moves back and forth the follower 73 moves in accordance with the contour of the edge 71' of the cam 70'.

Referring now to Figure 15, the diamond 96 and diamond 98 can be seen relative to the surface of a grinding wheel being dressed. As the diamond 96 travels back and forth along lines A, B, C, I, J, and E the diamond 98 will travel along the lines D, I, J, F, G, H. When the dressing diamond 96 is at A, dressing diamond 98 is at D; when diamond 96 is at B, dressing diamond 98 is at F, when diamond 96 is at E, diamond 98 is at H. It will be observed there is an overlap at I and J to insure an accurately formed contour. By inclining the diamonds toward each other the point of the diamonds are for all practical purposes perpendicular to the contour being dressed. This prolongs the life of the diamond as only a small portion of the diamond radius is in contact with the wheel. Also the contour of the grinding wheel becomes shallow to the axis of the diamonds.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A grinding wheel contour forming apparatus including a base, a cross slide housing assembly slidably mounted on said base for movement along said base, and comprising a housing, a first slide within said housing movable transversely of said base, and means on said base contacting said first slide for causing longitudinal movement of said cross slide housing assembly along said base, a second slide within said housing movable parallel to the movement of said housing assembly and relative thereto and contacting and controlled by said first slide, and a third slide on said housing and movable normally of said second slide and controlled by said second slide and a forming tool mounted on said third slide, movement of said first slide causing movement of said housing assembly along said base and movement of said forming tool normally of said base.

2. A grinding wheel dressing apparatus comprising a base, a cross slide assembly mounted for movement along said base, said cross slide assembly including a T-shaped housing, a first slide mounted in the head portion of said T-shaped housing, and supporting thereon a pair of cams, means connected to said first slide and cams for reciprocally moving said slide and cams along said head and transversely of the movement of said cross slide assembly, a fixed pin mounted on said base and contacting one of said cams, and a second slide having a cam follower contacting the other of said cams and movable longitudinally of the stem portion of said T-shaped housing and said base, a dressing tool having a slide mounted for vertical movement on the stem portion of the T-shaped housing, said second slide carrying a ratio cam and a pin mounted on the tool supporting slide contacting said ratio cam whereby vertical movement of said tool slide is effected when said second slide is moved longitudinally of said base.

3. A grinding wheel dressing apparatus comprising a base, a cross slide assembly mounted for movement along said base, said cross slide assembly including a housing, a first slide mounted in said housing and supporting thereon a pair of cams, means connected to said first slide and cams for reciprocably moving said slide and cams transversely of the movement of said cross slide assembly, a fixed pin mounted on said base and contacting one of said cams for determining longitudinal movement of said cross slide assembly along said base, and a second slide having a cam follower contacting the other of said cams and movable longitudinally of said base and parallel to the movement of said cross slide assembly, a dressing tool having a slide mounted for vertical movement on said housing and contacting and operated by said second slide, said second slide carrying a ratio cam contacting the dressing tool slide for operating the dressing tool slide whereby vertical movement of said tool slide is effected when said second slide moves longitudinally of said base.

4. A grinding wheel dressing apparatus comprising a base, a cross slide assembly mounted for movement along said base, said cross slide assembly including a housing, a first slide mounted in said housing and supporting thereon a pair of cams, means connected to said first slide and cams for reciprocably moving said slide and cams transversely of the movement of said cross slide assembly, a pin mounted on said base and contacting one of said cams, and a second slide having a cam follower contacting the other of said cams and movable longitudinally of said base and parallel to movement of said cross slide assembly, a dressing tool having a slide mounted for vertical movement on said housing, said second slide connected to said tool supporting slide whereby vertical movement of said tool slide is effected when said second slide moves longitudinally of said base, and means adjustably supporting said pin on said base whereby the position of said slide assembly on said base can be determined, and means urging said cross slide assembly and said cam against said pin.

5. A grinding wheel dressing apparatus including an elongated base having cavities provided at one end thereof, a cross slide assembly mounted on said base for movement along said base, spring means mounted within said cavities and contacting said cross slide assembly for urging said assembly in one direction along said base, and means including a pin on said base for limiting movement of said cross slide assembly by said spring means, said cross slide assembly including a housing, a first slide within said housing and supporting a pair of cam members, said slide being movable transversely of said base, one of said cams contacting said pin for causing movement of said housing longitudinally of said base when said slide moves transversely of said base, a mechanism including a vertically movable dressing tool support mounted on said housing, and a second slide and cam mechanism positioned between and contacting the other of said cams on said first slide and the support for said tool, said housing being moved longitudinally along said base and said tool support being moved vertically with respect to said base when said slide supporting said cams is reciprocated transversely of said base.

6. A grinding wheel dressing apparatus including an elongated base, a cross slide assembly mounted on said base for movement along said base, and means including a pin for determining movement of said cross slide assembly, said cross slide assembly including a housing, a first slide within said housing and supporting a pair of cam members, one of said cam members being of elongated triangular form and the other having a form of irregular shape for determining the contour on the wheel being dressed, said pin contacting the elongated triangular shaped cam for causing movement of said housing along said base, a second mechanism including a vertically movable dressing tool support, and a slide and cam mechanism positioned between and contacting the cam of irregular shape on said first slide and the second mechanism, said housing being moved longitudinally and said tool support being moved vertically with respect to the longitudinal axis of said elongated base when said first slide supporting said cams is reciprocated.

7. A contour dressing apparatus for a grinding wheel and including a base, a housing mounted on and slidable along said base, means supported by said housing for causing movement of said housing along said base and including a slide within said housing movable transversely of the movement of said housing and a cam mounted on said slide, means fixed to said base and contacting said cam for determining movement of said housing when said slide is moved, a tool support mounted on said housing and movable relative thereto in a direction normal to the movement of said housing, cam mechanism supported by said housing and contacting said tool support and having a follower contacting said slide for moving said tool support when said housing is moved, and a dressing tool assembly mounted on said tool support and comprising a pair of oppositely disposed diamond holders, each supporting a diamond tool for dressing like contours on a grinding wheel when said dressing tool assembly is moved thereacross.

8. A grinding wheel dressing apparatus comprising a base, a cross slide assembly mounted for movement along said base, said cross slide assembly including a housing, a first slide mounted in said housing and supporting thereon a pair of cams, means connected to said slide and cams for reciprocally moving said slide and cams transversely of the movement of said cross slide assembly, a fixed pin mounted on said base and contacting one of said cams for determining longitudinal movement of said cross slide assembly along said base and a second slide having a cam follower contacting the other of said cams and movable longitudinally of said base and parallel to the movement of said cross slide assembly, a dressing tool mounted for movement on said housing and contacting said second slide for operation by said second slide, said second slide carrying a cam contacting said dressing tool for operating the dressing tool when said second slide moves longitudinally of said base.

9. A grinding wheel dressing apparatus comprising a base, a cross slide assembly mounted for movement along said base, said cross slide assembly including a housing, a first slide mounted in said housing and supporting thereon a pair of cams, means connected to said first slide and cams for reciprocably moving said slide and cams transversely of the movement of said cross slide assembly, a pin mounted on said base and contacting one of said cams and a second slide having a cam follower contacting the other of said cams and movable longitudinally of said base and parallel to movement of said cross slide assembly, a dressing tool having a slide mounted for movement on said housing, said second slide connected to said tool supporting slide whereby movement of said tool slide is affected when said second slide moves longitudinally of said base, and means urging said cross slide assembly and said cam against said pin.

10. A contour dressing apparatus for a grinding wheel and including a base, a housing mounted on and slidable along said base, means supported by said housing for causing movement of said housing along said base and including a first slide within said housing and a cam mounted on said first slide, means fixed to said base and contacting said cam for determining movement of said housing when said first slide is moved, a tool support mounted on said housing and movable relative thereto in a direction normal to the movement of said housing, cam mechanism supported by said housing and mounted on a second slide and contacting said tool support and having a follower contacting said first slide for moving said tool support when said housing is moved, and a dressing tool mounted on said tool support for dressing a contour on the grinding wheel when said dressing tool is moved thereacross.

11. A grinding wheel contour dressing apparatus including a base, a cross slide housing assembly slidably mounted on said base for movement in one direction along said base and comprising a housing, a first slide within said housing slidably supported therein and movable normal to said one direction, and means on said base operatively connected with said slide for causing movement of said housing in said one direction along said base, a second slide within said housing slidably supported thereby and movable normal to the movement of said housing and relative thereto and normal to the movement of said first slide and means connecting said first slide and said second slide for controlling movement of said second slide and a dressing tool mounted on said second slide.

12. A grinding wheel contour dressing apparatus including a base, a housing on and slidable along said base, means supported by said housing for causing movement of said housing along said base and including a slide and a cam within said housing and slidable transversely of the movement of said housing and a pin fixed to said base contacting said cam for determining movement of said housing when said slide is moved, a tool support mounted on said housing and movable relative thereto in a direction normal to the movement of said housing, cam mechanism supported by said housing contacting said tool support and actuated when said housing is moved relative to said base and a dressing tool assembly mounted on said tool support and comprising a pair of oppositely disposed diamond holders each supporting a diamond tool for dressing-contours on a grinding wheel when said dressing tool assembly is moved thereacross, a mechanism positioned between and contacting said cam mechanism and said slide for controlling movement of said tool support for determining the contour on said grinding wheel.

NILS HOGLUND.

References Cited in the file of this patent

UNITED STATES PATENTS

| Number | Name | Date |
| --- | --- | --- |
| 2,159,207 | Godfriaux | May 23, 1939 |
| 2,317,411 | Seyferth | Sept. 27, 1943 |

FOREIGN PATENTS

| Number | Country | Date |
| --- | --- | --- |
| 398,841 | Great Britain | Sept. 19, 1933 |
| 521,257 | Great Britain | May 16, 1940 |